United States Patent
Chou

(10) Patent No.: US 8,890,436 B2
(45) Date of Patent: Nov. 18, 2014

(54) COLOR TEMPERATURE ADJUSTABLE LED LAMP

(71) Applicant: Delta Electronics, Inc., Taoyuan Hsien (TW)

(72) Inventor: Ching-Ho Chou, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 107 days.

(21) Appl. No.: 13/726,594

(22) Filed: Dec. 25, 2012

(65) Prior Publication Data

US 2014/0042920 A1    Feb. 13, 2014

(30) Foreign Application Priority Data

Aug. 7, 2012    (TW) ................ 101128372 A

(51) Int. Cl.
*H05B 37/02*    (2006.01)

(52) U.S. Cl.
CPC *H05B 37/02* (2013.01); *Y02B 20/40* (2013.01)
USPC ........... 315/294; 315/291; 315/307; 315/312; 315/192; 315/153

(58) Field of Classification Search
CPC .......... H05B 37/02; H05B 33/0824; H05B 33/0803; H05B 33/0815; H05B 33/0857; H05B 33/0865; F21K 9/135; F21K 9/30; F21K 9/56; F21Y 2101/02; F21Y 2103/003; Y02B 20/40; Y02B 20/383; Y02B 20/30
USPC ........... 315/152, 153, 185 R, 192, 294, 312, 315/318, 201, 291, 307; 362/95, 249.02, 362/249.06, 311.02, 353
See application file for complete search history.

(56) References Cited

U.S. PATENT DOCUMENTS

| | | | | |
|---|---|---|---|---|
| 7,281,820 B2 * | 10/2007 | Bayat et al. | ................... | 362/245 |
| 8,100,552 B2 * | 1/2012 | Spero | ............................ | 362/231 |
| 8,212,469 B2 * | 7/2012 | Rains, Jr. et al. | ............. | 313/503 |
| 8,434,909 B2 * | 5/2013 | Nichol et al. | ............ | 362/296.01 |
| 8,669,722 B2 * | 3/2014 | Yeh et al. | ....................... | 315/313 |
| 8,810,141 B2 * | 8/2014 | Takeda et al. | .................. | 315/201 |

* cited by examiner

*Primary Examiner* — Haiss Philogene
(74) *Attorney, Agent, or Firm* — CKC & Partners Co., Ltd.

(57) ABSTRACT

A color temperature adjustable LED lamp is disclosed, which includes a 3-way lamp socket and a 3-way lamp head. The 3-way lamp socket has a 3-way switch. The 3-way lamp head is connected to the 3-way lamp socket and has a first LED array and a second LED array. The color temperature of the first LED array is different from the color temperature of the second LED array. The color temperature adjustable LED lamp includes a mains detecting circuit for detecting a conducting state of a first live wire and a second live wire in the 3-way switch to selectively operate the first LED array, the second LED array or alternatively operates the first and second LED array.

8 Claims, 17 Drawing Sheets

COLOR TEMPERATURE ADJUSTABLE LED LAMP

RELATED APPLICATIONS

This application claims priority to Taiwan Application Serial Number 101128372, filed Aug. 7, 2012, which is herein incorporated by reference.

BACKGROUND

1. Field of Invention

The present invention relates to an LED lamp. More particularly, the present invention relates to a color temperature adjustable LED lamp having a 3-way switch.

2. Description of Related Art

For a fluorescent tube the wavelength of the light emitted by a filament can be changed through phosphor powders. The existing color temperature adjustable lighting lamps mostly use two kinds of fluorescent tubes with different color temperatures to achieve a mixed light. For example, two kinds of fluorescent tubes are arranged in the same lighting lamp, wherein the color temperature of one fluorescent tube is 2600 k (warm white light), and the color temperature of the other fluorescent tube is 5600 k (cold white light). By operating the switch, a fluorescent tube to emit light can be selected. When the two kinds of fluorescent tubes with different color temperatures operate at the same time, a light source with a color temperature between 2600 k and 5600 k can be obtained. However, due to the large volume of the fluorescent tube, the volume of this color temperature adjustable lighting lamp is hard to be reduced. Furthermore, since the two kinds of fluorescent tubes need to be turned on at the same time for mixing lights, the lighting illumination at this time is twice of the lighting illumination generated when a fluorescent tube with a single color temperature is used. This may easily discomfort users.

An LED has the properties of high durability, long lifetime, light weight, low power consumption and so on, which is a desired lighting light source in the new times. Particularly under the current situation that the energy cost is gradually increasing, the LED gets attention and is used by the industry, to replace other light-emitting components with higher power consumptions.

Applying an LED to lighting lamps can reduce the volume of the lighting lamps, but the subsequent topic to be solved is how to make a further utilization of the LED as a light source and design the LED as a color temperature adjustable lamp.

SUMMARY

The present invention is directed to provide a color temperature adjustable LED lamp for reducing the control cost.

The present invention is further directed to design and obtain a color temperature adjustable LED lamp according to a standard 3-way switch.

According to an embodiment of the present invention, a color temperature adjustable LED lamp is provided. The color temperature adjustable LED lamp includes a 3-way switch, a mains detecting circuit, an AND logic circuit, an oscillation circuit, a first LED array and a second LED array. The 3-way switch is used to selectively conduct a first live wire, a second live wire or the first and second live wires. The mains detecting circuit is connected to the 3-way switch for detecting a conducting state of the first live wire and the second live wire. When the first live wire is conducted, a first partial voltage signal is generated. When the second live wire is conducted, a second partial voltage signal is generated. The AND logic circuit is connected to the mains detecting circuit. When receiving the first partial voltage signal and the second partial voltage signal at the same time, the AND logic circuit sends a working signal. The oscillation circuit is connected to the AND logic circuit, and the oscillation circuit generates an oscillation signal response to the working signal. The first LED array is actuated while receiving the first partial voltage signal or the oscillation signal. The second LED array is actuated while receiving the second partial voltage signal or the oscillation signal. When the 3-way switch only conducts the first live wire, only the first LED array is actuated to emit a light with a first color temperature. When the 3-way switch only conducts the second live wire, only the second LED array is actuated to emit a light with a second color temperature. The first LED array includes a first switch and plural first LEDs connected with each other. The second LED array includes a second switch and plural second LEDs connected with each other. The first color temperature of the first LED is different from the second color temperature of the second LED. The first switch is connected to the mains detecting circuit and the oscillation circuit signal. The second switch is connected to the mains detecting circuit and the oscillation circuit signal. When the 3-way switch conducts the first and second live wires, only the oscillation signal is sent to the first LED array and the second LED array, and thus the first LED array and the second LED array are alternatively operated. The color temperature adjustable LED lamp further includes a driving circuit connected to the AND logic circuit and the mains detecting circuit. The driving circuit includes a driving switch. The driving switch is connected to a ground terminal. When the working signal is received by the driving circuit the driving switch is conducted for connecting the first partial voltage signal and the second partial voltage signal to the ground. The mains detecting circuit includes a rectifier circuit, a first voltage divider circuit and a second voltage divider circuit. The rectifier circuit is used for converting an alternating current into a direct current. The first voltage divider circuit is connected to the rectifier circuit for generating a first partial voltage signal. The second voltage divider circuit is connected to the rectifier circuit for generating a second partial voltage signal.

Another embodiment of the present invention provides a color temperature adjustable LED lamp. The color temperature adjustable LED lamp includes a 3-way lamp socket and a 3-way lamp head. The 3-way lamp socket includes a 3-way switch. The 3-way switch is used to selectively conduct a first live wire, a second live wire or the first and second live wires. The 3-way lamp head is connected to the 3-way lamp socket and has a first LED array, a second LED array and a control chip. The control chip connects the 3-way switch to the first and second LED arrays to make the first LED array emit the light with the first color temperature and make the second LED array emit the light with the second color temperature, or to alternatively operate the first and second LED arrays so as to emit a light with a color temperature between the first color temperature and the second color temperature. The first LED array includes plural first LEDs. The second LED array includes plural second LEDs. The color temperature of the first LED is different from the color temperature of the second LED.

The color temperature adjustable LED lamp uses two kinds of LEDs with different color temperatures as light sources. Compared with using the fluorescent tube as the light source, the usage of the color temperature adjustable LED lamp can not only reduce the volume of the lighting lamp, but also has the benefits of environmental protection and power saving.

Furthermore, the color temperature adjustable LED lamp uses the 3-way switch to control the actuation modes of the first LED array and the second LED array. During mixing of lights, instead of actuating simultaneously the first LED array and the second LED array are conducted alternatively, so as to solve the problem of uneven brightness.

BRIEF DESCRIPTION OF THE DRAWINGS

In order to make the foregoing as well as other aspects, features, advantages, and embodiments of the present invention more apparent, the accompanying drawings are described as follows.

DETAILED DESCRIPTION

The following drawings and detailed illustrations clearly illustrate the spirit of the present invention. Those skilled in the art can make modifications and variations without departing from the spirit and scope of the present invention according to the techniques taught in the present invention after understanding the embodiments of the present invention.

The color temperature adjustable LED lamp of the present invention uses two kinds of LEDs with different color temperatures for mixing lights to change the color temperature. In order to reduce the control cost, the color temperature adjustable LED lamp of the present invention directly uses a 3-way switch as a control component of a lamp, and combines the 3-way switch with a simple circuit to provide three kinds of lights with different color temperatures.

Figure 1:
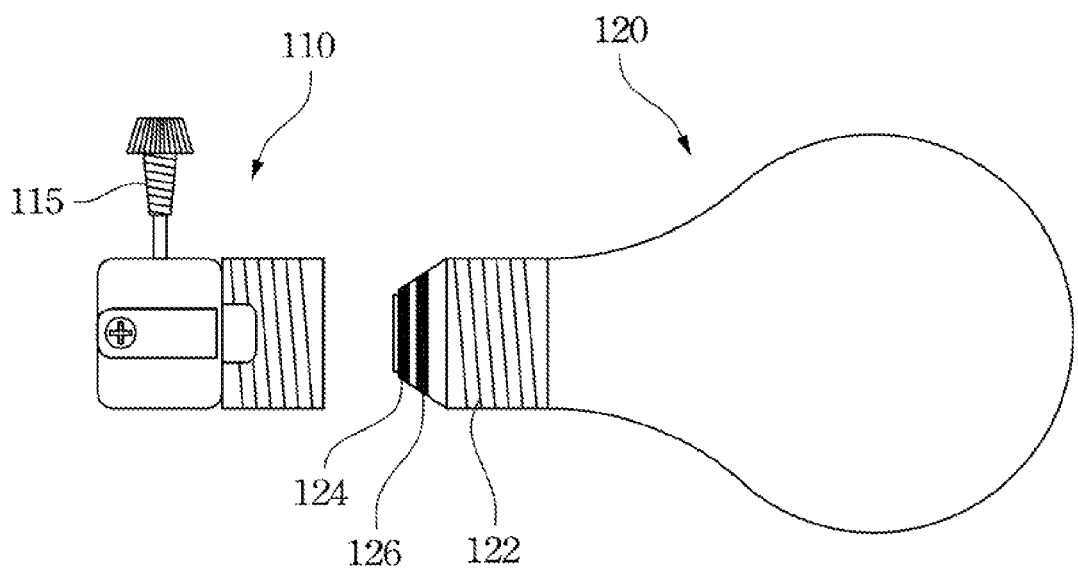
FIG. 1 is an exploded appearance view of an embodiment of the color temperature adjustable LED lamp of the present invention.

FIG. 1 is an exploded appearance view of the color temperature adjustable LED lamp of the present invention in an embodiment. The color temperature adjustable LED lamp 100 includes a 3-way lamp socket 110 and a 3-way lamp head 120. The 3-way lamp head 120 has two kinds of LED arrays with different color temperatures (not shown) therein. The 3-way lamp socket 110 is connected to a mains power supply and the 3-way lamp head 120. A 3-way switch 115 is arranged on the 3-way lamp socket 110. The mains power supply includes a ground wire, a first live wire and a second live wire. The 3-way lamp head 120 has an exposed ground wire contact 122, a first live wire contact 124 and a second live wire contact 126. The 3-way lamp socket 110 also has contacts therein each connected to the exposed ground wire contact 122, the first live wire contact 124 and the second live wire contact 126.

The 3-way switch 115 has four operation modes, so as to change the conducted wiring line by operating the 3-way switch 115 and further turn on the corresponding LED array. Referring to FIGS. 2A-2D, they illustrate different operation modes of the 3-way switch 115 and the light-emitting states of the 3-way lamp head 120 corresponding to the different operation modes.

Figure 2A:
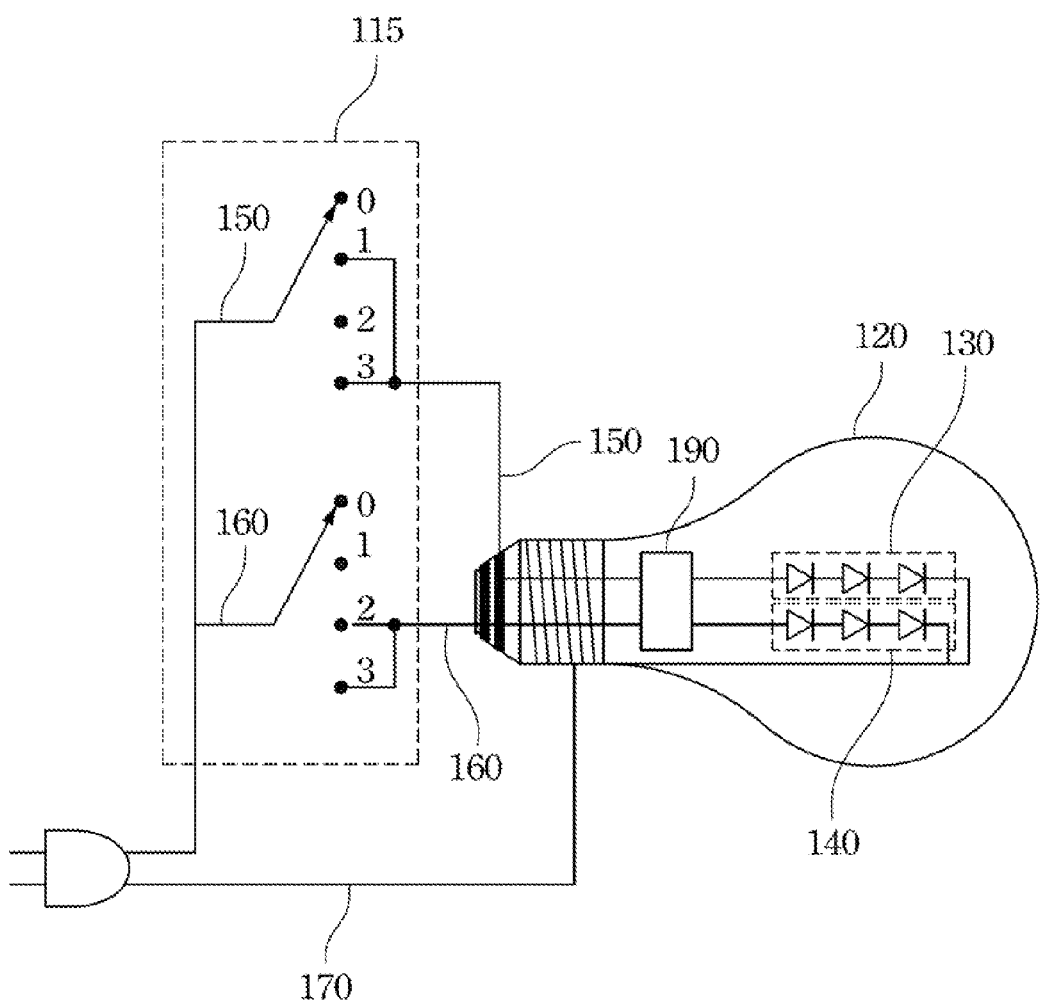
FIGS. 2A-2D are different operation modes of the 3-way switch and light-emitting states of the 3-way lamp head corresponding to the different operation modes in another embodiment of the color temperature adjustable LED lamp.

FIG. 2A is a schematic switch circuit diagram of the 3-way switch under an initial operation mode. When the 3-way switch 115 in FIG. 1 is switched to the initial operation mode, the first live ire 150 and the second live wire 160 are both turned off. That is, no current enters the first LED array 130 and the second LED array 140 in the 3-way lamp head 120. At this time, the 3-way lamp head 120 does not emit light. In other words, when the 3-way switch 115 is switched to the initial operation mode, the color temperature adjustable LED lamp 100 of the present invention is turned off.

Figure 2B:
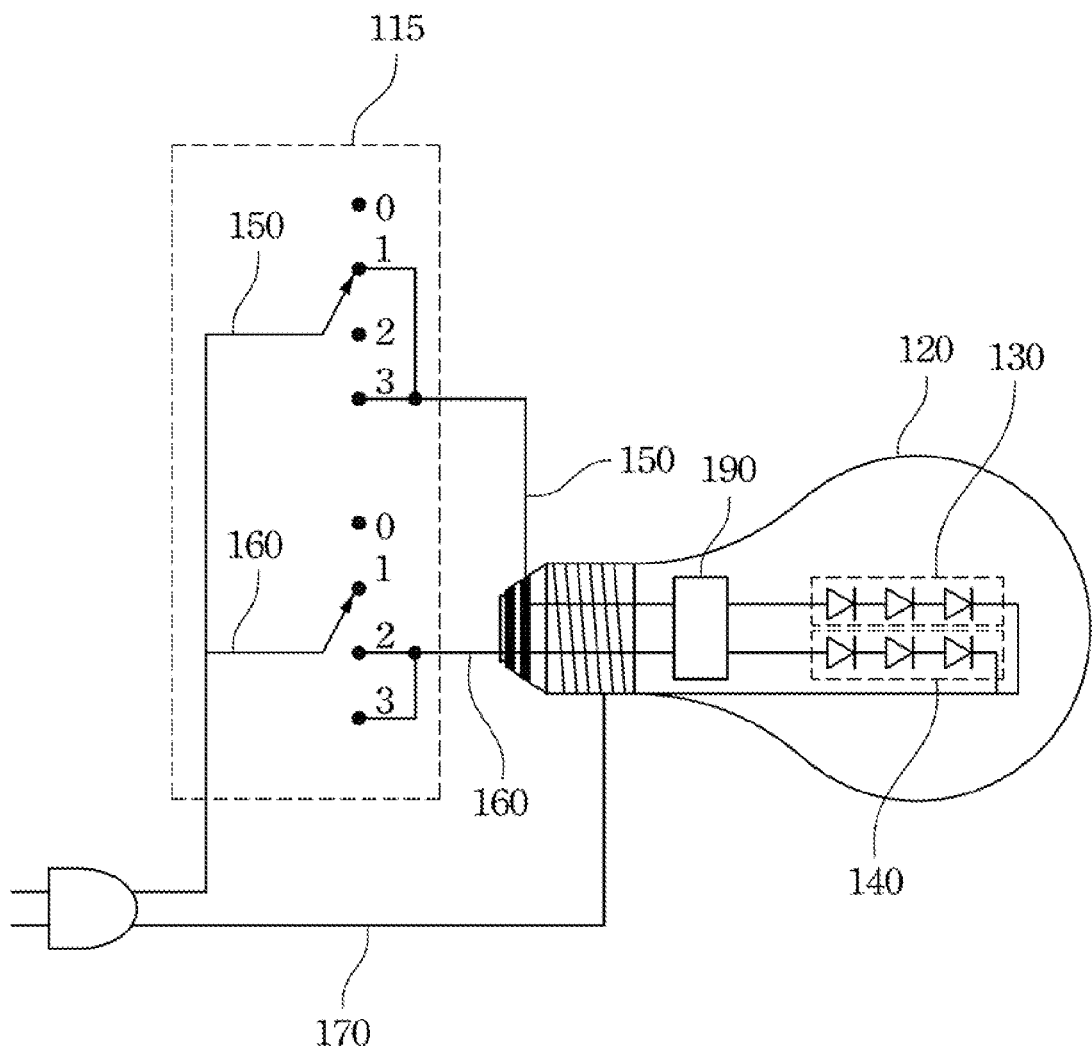

FIG. 2B is a schematic switch circuit diagram of the 3-way switch under the first operation mode. When the 3-way switch 115 in FIG. 1 is switched to the first operation mode, only the first live wire 150 is conducted and the second live wire 160 is turned off. That is, the current flows from the first live wire 150 to the first LED array 130 and the ground wire 170 to form a loop, making the first LED array 130 emit light, and no current flows through the second live wire 160, so that the second LED array 140 does not emit light. In other words, when the 3-way switch 115 is switched to the first operation mode, the color temperature of the light emitted by the color temperature adjustable LED lamp 100 is the first color temperature of the first LED array 130.

Figure 2C:
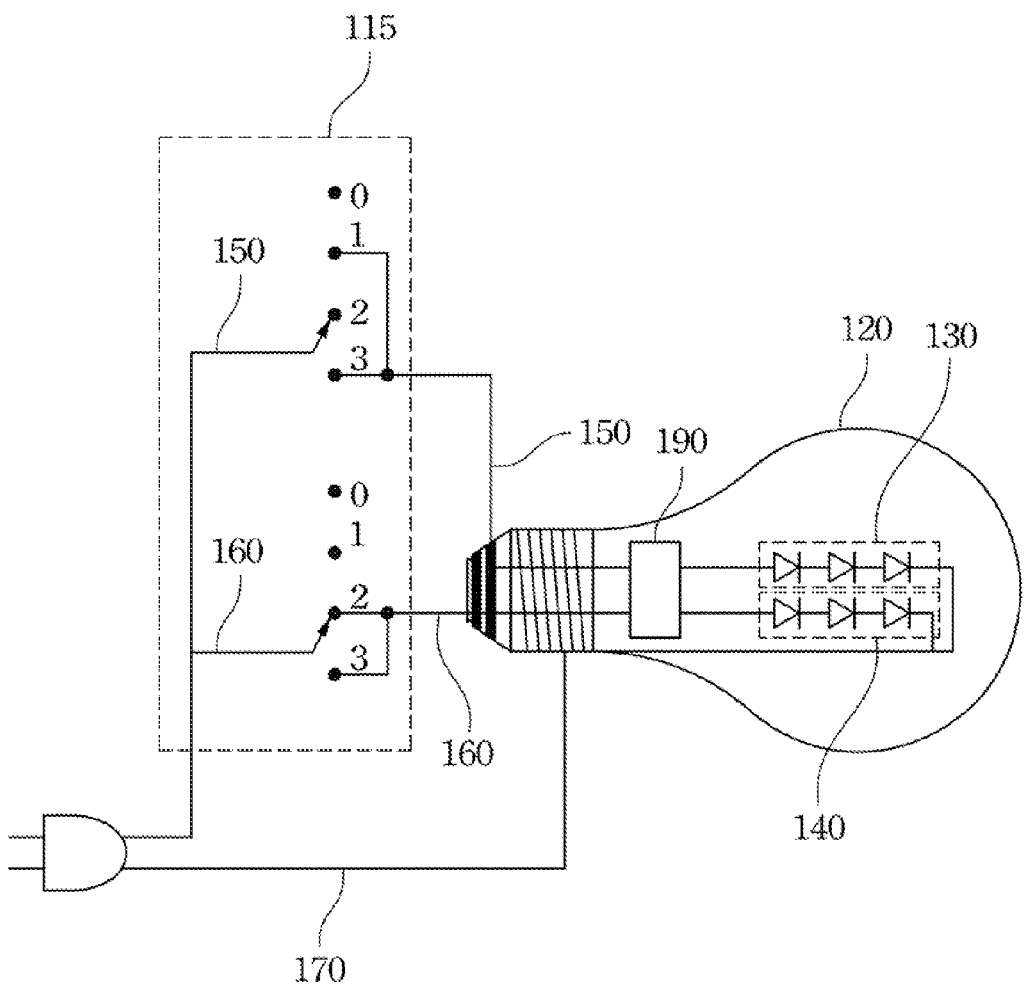

FIG. 2C is a schematic switch circuit diagram of the 3-way switch under a second operation mode. When the 3-way switch 115 in FIG. 1 is switched to the second operation mode, only the second live wire 160 is conducted and the first live wire 150 is turned off. That is, the current flows from the second live wire 160 to the second LED array 140 and the ground wire 170 to form a loop, making the second LED array 140 emit light, and no current flows through the first live wire 150, so that the first LED array 130 does not emit light. In other words, when the 3-way switch 115 is switched to the second operation mode, the color temperature of the light emitted by the color temperature adjustable LED lamp 100 is the second color temperature of the second LED array 140. The second color temperature is different from the first color temperature. For example, the first color temperature may be a white light while the second color temperature is a yellow light.

Figure 2D:
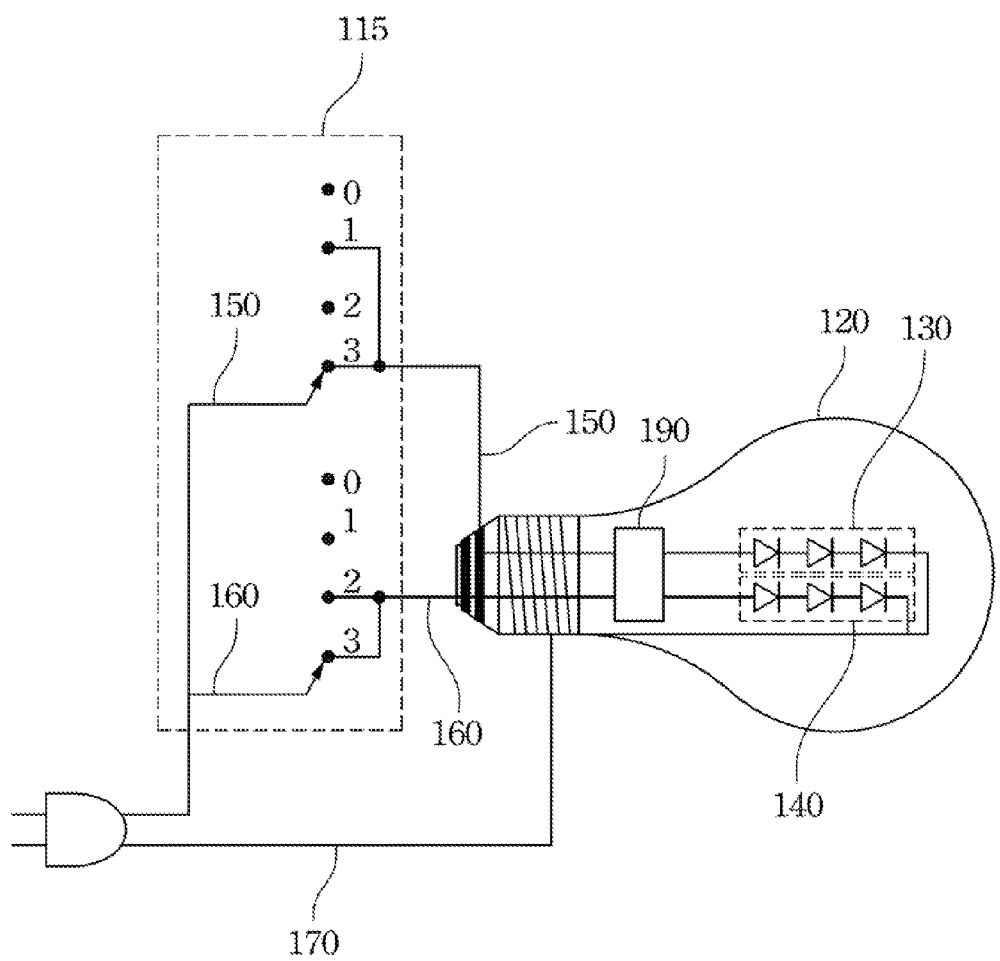

FIG. 2D is a schematic switch circuit diagram of the 3-way switch under a third operation mode. When the 3-way switch 115 in FIG. 1 is switched to the third operation mode, the first live wire 150 and the second live wire 160 are both conducted. The current flows from the first live wire 150 to the first LED array 130 and the ground wire 170 to form a loop, making the first LED array 130 emit light. At the same time, the current flows from the second live wire 160 to the second LED array 140 and the ground wire 170 to form a loop, making the second LED array 140 emit light. In other words, when the 3-way switch 115 is switched to the third operation mode, the third color temperature of the light emitted by the color temperature adjustable LED lamp 100 is equivalent to the color temperature of the light mixed from the light emitted by the first LED array 130 and the light emitted by the second LED array 140. That is, the third color temperature is between the first color temperature and the second color temperature.

In other words, the 3-way switch 115 is used to selectively conduct the first live wire 150, the second live wire 160 or the first live wire 150 and the second live wire 160. When the 3-way switch 115 is under the first operation mode, only the first live wire 150 is conducted. When the 3-way switch 115 is under the second operation mode, only the second live wire 160 is conducted. When the 3-way switch 115 is under the third operation mode, the first live wire 150 and the second live wire 160 are both conducted.

Moreover, the color temperature adjustable LED lamp 100 of the present invention further includes a control circuit 190. The control circuit 190 is connected to the first live wire 150, the second live wire 160, the first LED array 130 and the second LED array 140, to control operations of the first LED array 130 and the second LED array 140 according to the conducting states of the first live wire 150 and the second live wire 160, thereby avoiding over-brightness caused by simultaneous operations of the first LED array 130 and the second LED array 140.

Figure 3:
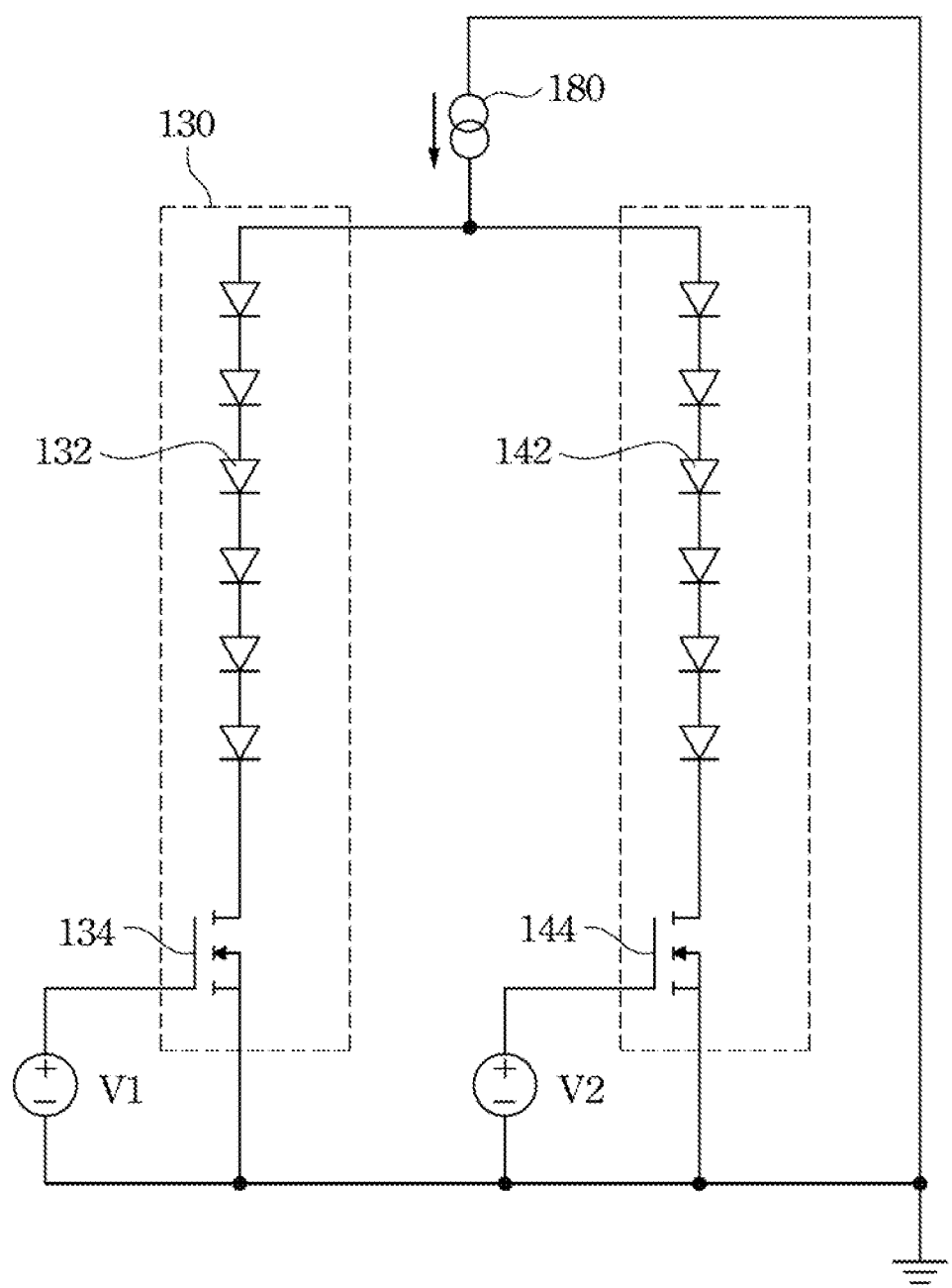
FIG. 3 is a circuit diagram of the light-emitting array in a further embodiment of the color temperature adjustable LED lamp of the present invention.

FIG. 3 is a circuit diagram of the light-emitting array in a further embodiment of the color temperature adjustable LED lamp of the present invention. The light-emitting array includes a first LED array 130 and a second LED array 140. The first LED array 130 includes plural first LEDs 132 and a first switch 134 connected to the plural first LEDs 132. The second LED array 140 includes plural second LEDs 142 and a second switch 144 connected to the plural second LEDs 142. The color temperature of the first LED 132 is different from the color temperature of the second LED 142. For example, the first LED 132 may be a white LED. The color temperature of the light emitted by the first LED 132 is a first color temperature. The second LED 142 may be a yellow LED. The color temperature of the light emitted by the second LED 142 is a second color temperature. The second color temperature is different from the first color temperature. A nature light with a third color temperature between the first color temperature and the second color temperature can be obtained after the mixture of the light emitted by the first LED 132 and the light emitted by the second LED 142.

Figure 4A:
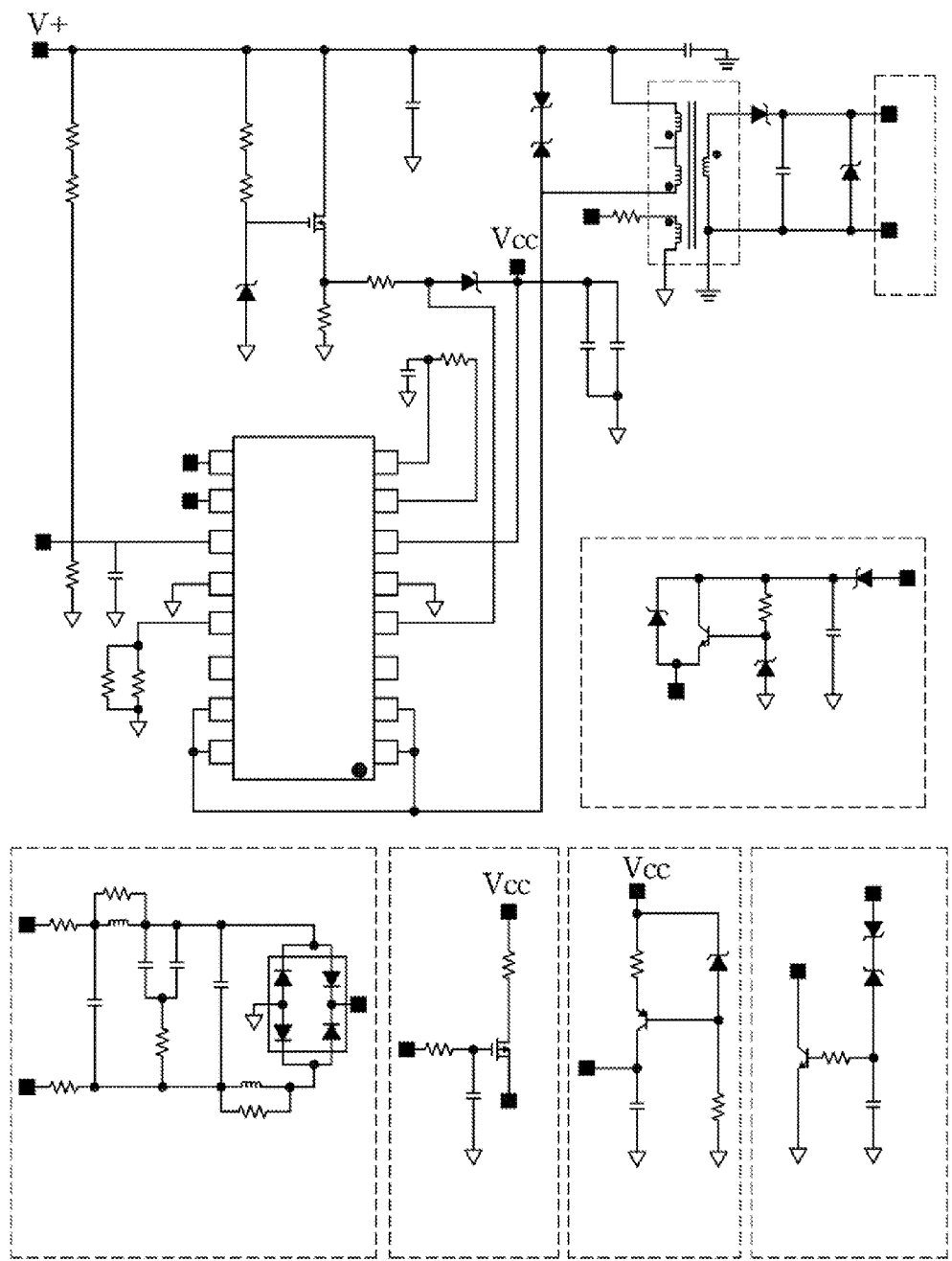
FIGS. 4A and 4B respectively illustrates a circuit diagram applied in different embodiments of the power supply circuit of the present invention.
Figure 4B:
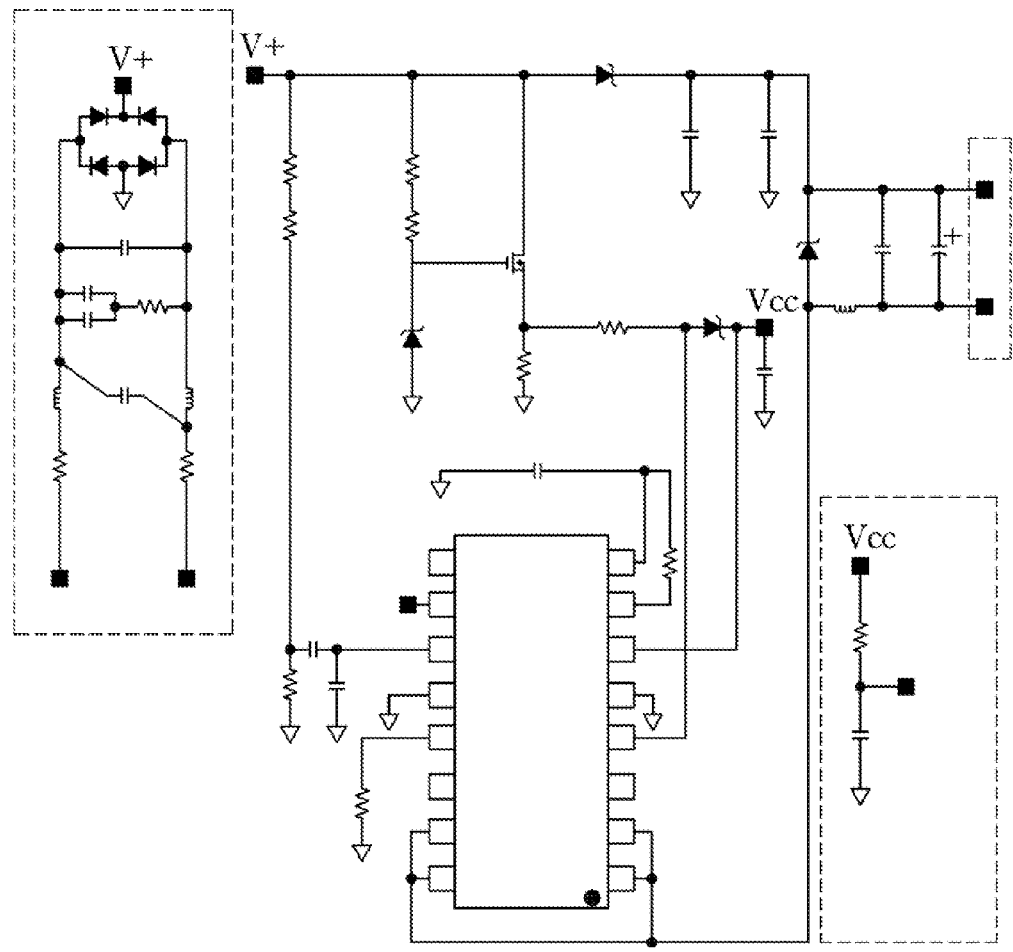

Preferably, the first LED 132 and the second LED 142 are arranged alternatively. The first switch 134 is used to control conduction of the first LED 132. The second switch 144 is used to control conduction of the second LED 142. The first LED array 130 and the second LED array 140 are further connected to the power supply circuit 180. The power supply circuit 180 is also connected to the mains. The power supply circuit 180 is a power supply circuit having a constant current. The power supply circuit 180 may be a flyback converter as shown in FIG. 4A. Alternatively, the power supply circuit 180 may be a buck converter as shown in FIG. 4B.

Figure 5:
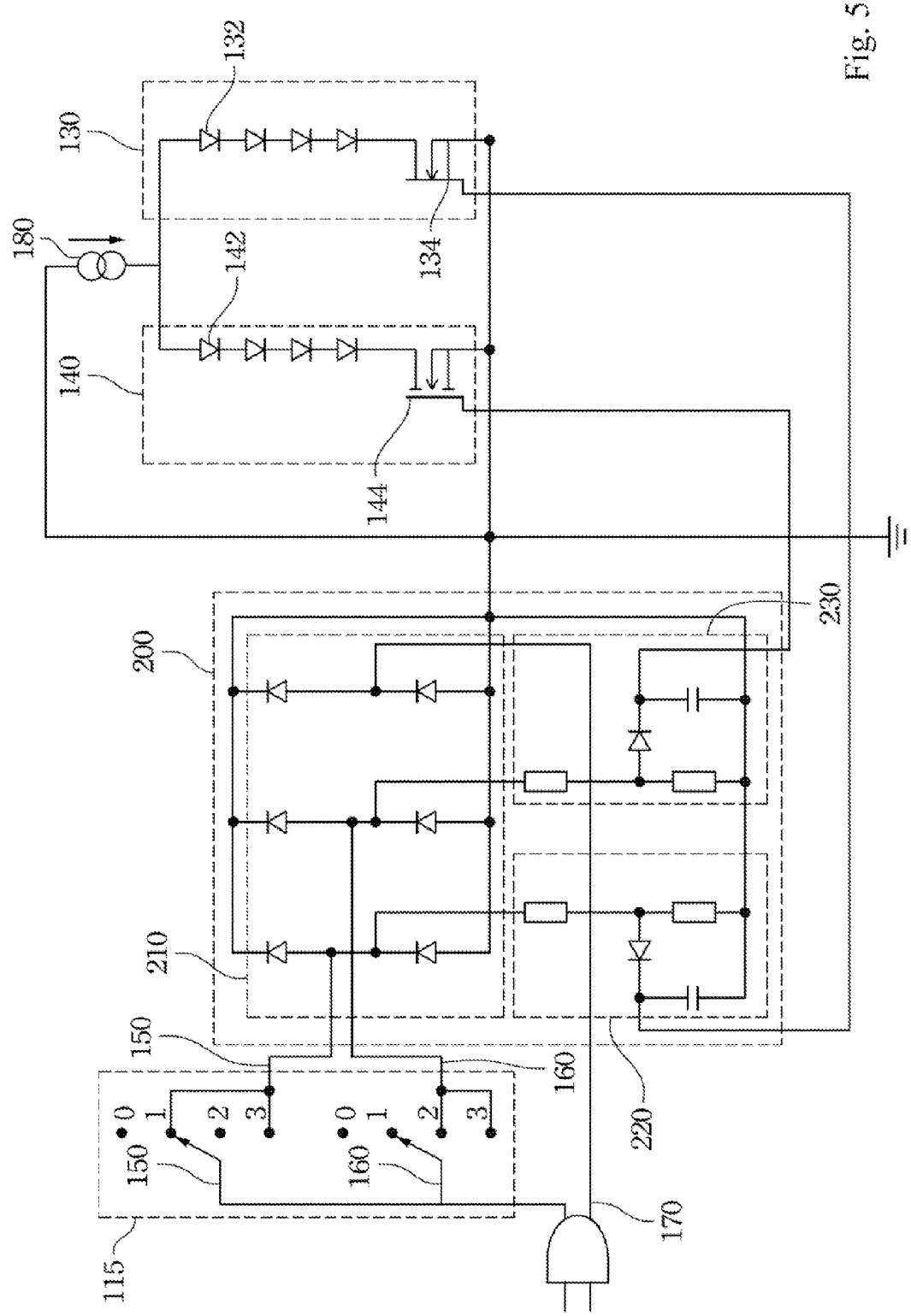
FIG. 5 is a schematic circuit diagram of the mains detecting circuit of the color temperature adjustable LED lamp in yet a further embodiment of the present invention.

FIG. 5 is a schematic circuit diagram of the mains detecting circuit of the color temperature adjustable LED lamp in yet a further embodiment of the present invention. The mains detecting circuit 200 includes a rectifier circuit 210, a first voltage divider circuit 220 and a second voltage divider circuit 230. The first live wire 150, the second life wire 160 and the ground wire 170 are connected to the rectifier circuit 210 for converting an alternating current into a direct current. The rectifier circuit 210 may be a 3-way bridge rectifier. The first voltage divider circuit 220 and the second voltage divider circuit 230 of the mains detecting circuit 200 can generate different combinations of voltage signals to control the on or off state of the first LED array 130 and the second LED array 140 according to different operation modes from the initial operation mode to the third operation mode.

In particular, under the initial operation mode, the first live wire 150 and the second live wire 160 are both turned off. Under the first operation mode, the current flows from the first live wire 150 to the rectifier circuit 210, and then a first partial voltage signal is generated through the first voltage divider circuit 220 for conducting the first switch 134 to actuate the first LED array 130. Under the second operation mode, the current flows from the first live wire 160 to the rectifier circuit 210, and then a second partial voltage signal is generated through the second voltage divider circuit 230 for conducting the second switch 144 to actuate the second LED array 140. Under the third operation mode, the current flows from the first live wire 150 and the second live wire 160 to the rectifier circuit 210 and then a first and second partial voltage signals are respectively generated through the first voltage divider circuit 220 and the second voltage divider circuit 230, for conducting the first switch 134 and the second switch 144 to actuate the first LED array 130 and the second LED array 140.

Figure 6:
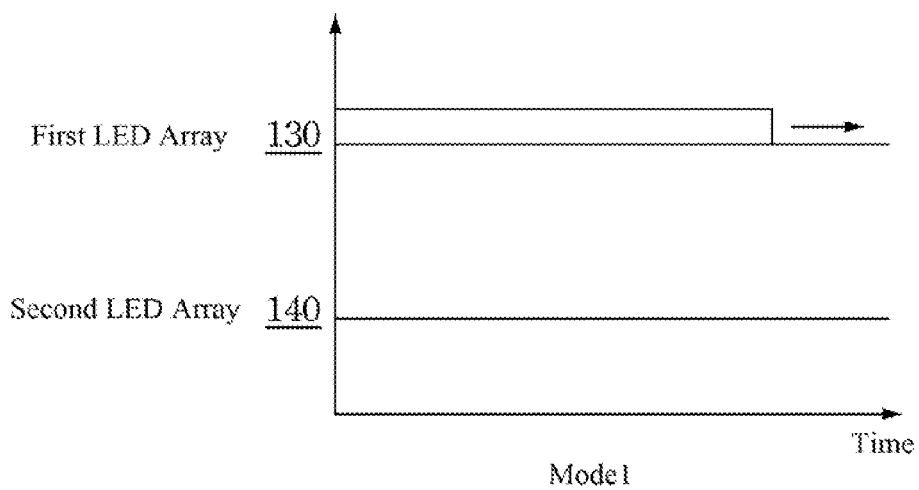
FIG. 6 is the working cycles of the first LED array and the second LED array of the color temperature adjustable LED lamp of the present invention from the first operation mode to the third operation mode.
Figure 6:
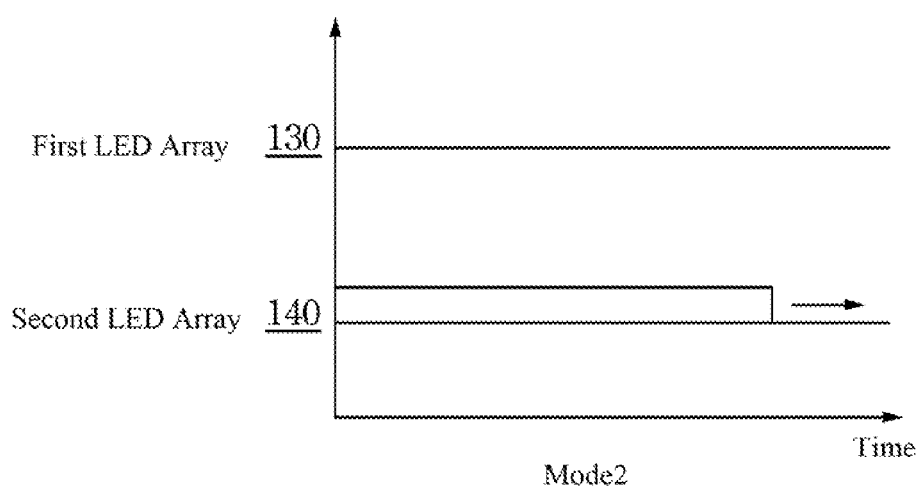
Figure 6:
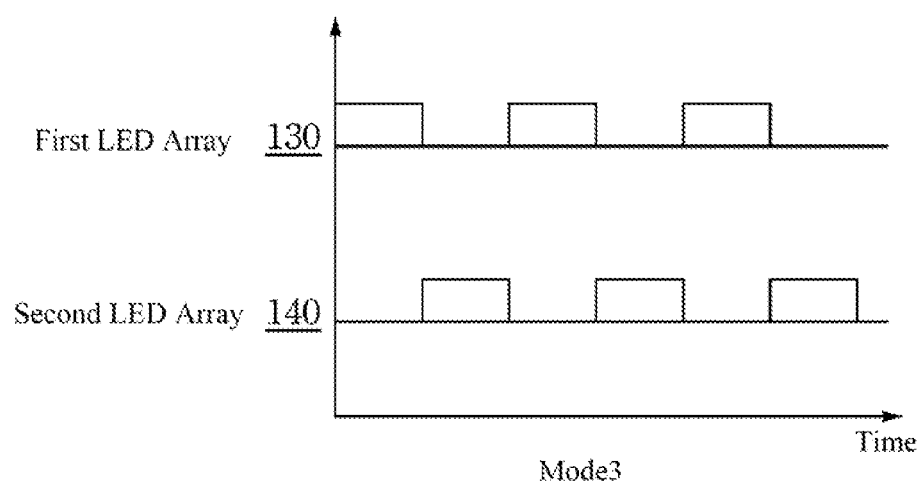

The working cycles of the first LED array 130 and the second LED array 140 of the color temperature adjustable LED lamp of the present invention from the first operation mode to the third operation mode are shown in FIG. 6. Under the first operation mode, only the first LED array 130 is operated. At this time, the color temperature of the light emitted by the first LED array 130 is the first color temperature. Under the second operation mode, only the second LED array 140 is operated. At this time, the color temperature of the light emitted by the second LED array 140 is the second color temperature. Under the third operation mode, the first LED array 130 and the second LED array 140 are both operated for mixing the lights. At this time, the third color temperature of the resulted mixed light is between the first color temperature and the second color temperature. That is, the first LED array 130 and the second LED array 140 are alternatively operated instead of being conducted at the same time. As long as the working frequency is over 200 Hz, the discomfort of flicker does not appear. In the present invention, this alternative working cycle can be generated through an oscillation circuit, and the working signal thereof can be obtained through an AND logic circuit.

Figure 7A:
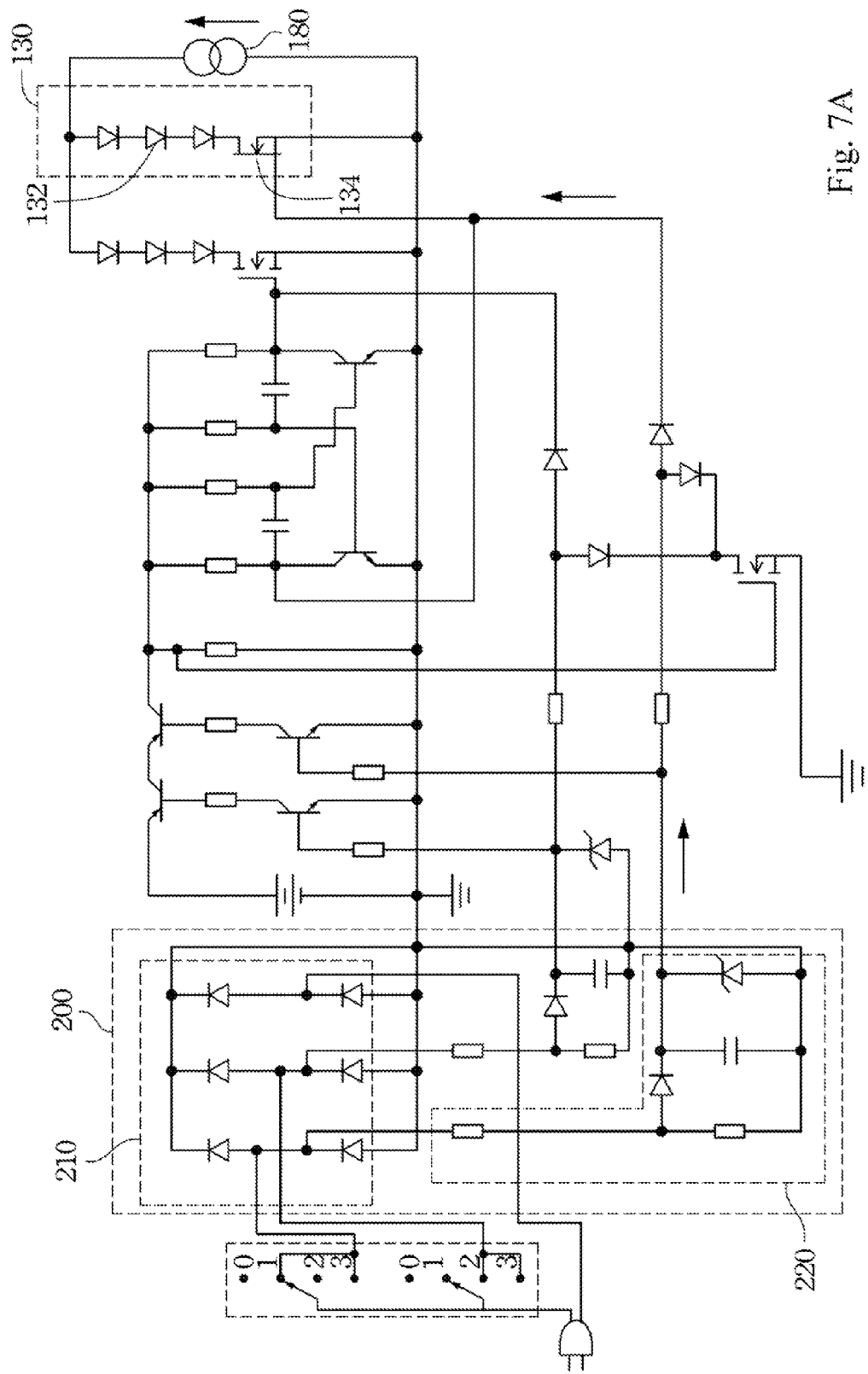
FIGS. 7A-7C each illustrates a circuit diagram of still yet a further embodiment of the color temperature adjustable LED lamp of the present invention under different operation modes.
Figure 7B:
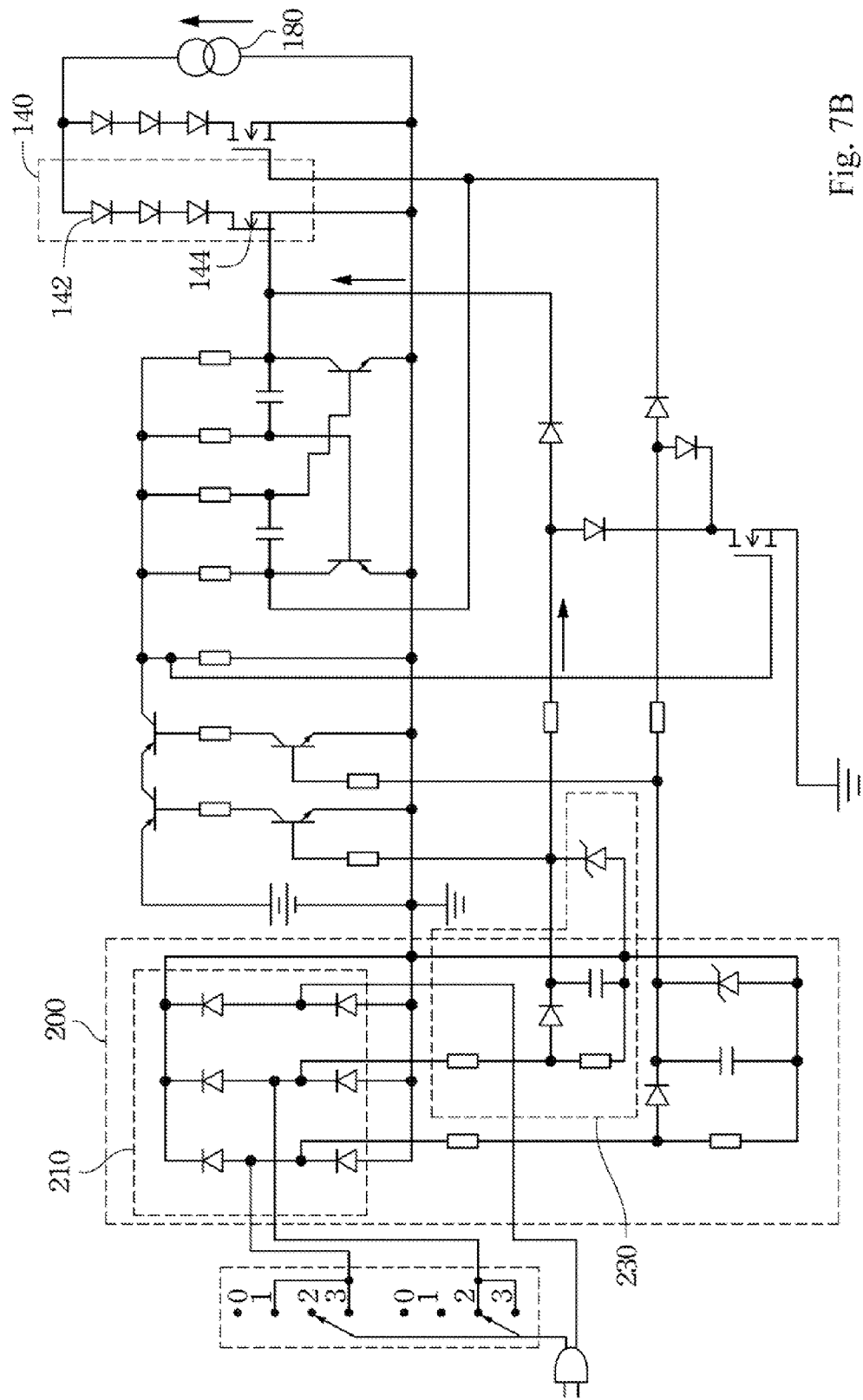
Figure 7C:
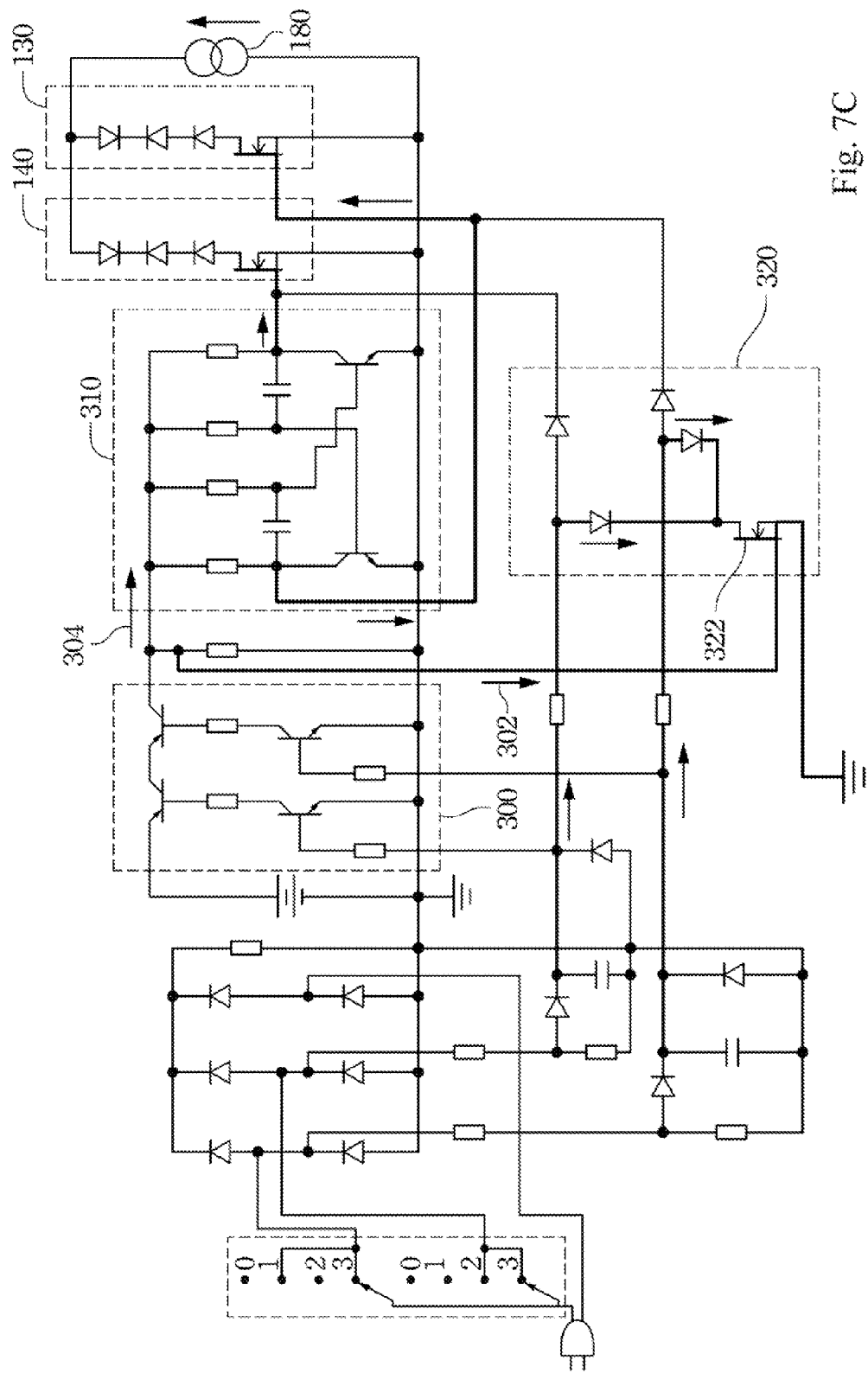

FIGS. 7A-7C each illustrates a circuit diagram of still yet a further embodiment of the color temperature adjustable LED lamp of the present invention under different operation modes. A 3-way switch 115 is used to select the operation mode. The mains detecting circuit 200 is connected to the 3-way switch 115. The mains detecting circuit 200 includes a rectifier circuit 210, a first voltage divider circuit 220 and a second voltage divider circuit 230. The rectifier circuit 210 converts an alternating current into a direct current. The first voltage divider circuit 220 is used to generate a first partial voltage signal for actuating the first LED array 130. The second voltage divider circuit 230 is used to generate a second partial voltage signal for actuating the second LED array 140.

Referring to FIG. 7A, when the 3-way switch 115 is under the first operation mode, a first partial voltage signal is generated through the first voltage divider circuit 220. The first partial voltage signal is directly sent to the first LED array 130 to conduct the first switch 134 for operating the first. LED 132. At this time, the light emitted by the first LED 132 has a first color temperature.

Referring to FIG. 7B, when the 3-way switch 115 is under the second operation mode, a second partial voltage signal is generated through the second voltage divider circuit 230. The second partial voltage signal is directly sent to the second LED array 140 to conduct the second switch 144 for operating the second LED 142. At this time, the light emitted by the second LED 142 has a second color temperature. The second color temperature is different from the first color temperature.

Referring to FIG. 7C, as described above, when the 3-way switch 115 is under the third operation mode, if the first partial voltage signal and the second partial voltage signal directly enter the first LED array 130 and the second LED array 140, the first LED array 130 and the second LED array 140 are operated at the same time to cause the overbrightness. Therefore, the color temperature adjustable LED lamp 100 further includes an AND logic circuit 300, an oscillation circuit 310 and a driving circuit 320, for alternatively operating the first LED array 130 and the second LED array 140 under the third operation mode.

In particular when the first partial voltage signal and the second partial voltage signal are generated at the same time, the AND logic circuit 300 actuates and thus generates a driving signal 302 to the driving circuit 320, so that the driving switch 322 in the driving circuit 320 is conducted. The first partial voltage signal and the second partial voltage signal are connected to the ground to prevent the first partial voltage signal and the second partial voltage signal from being directly sent to the first. LED array 130 and the second LED array 140. Moreover, after the actuation of the AND logic circuit 300, a working signal 304 is sent to the oscillation circuit 310 for making the oscillation circuit 310 generate an oscillation signal to the first LED array 130 and the second LED array 140 response to the working signal, so as to control the working cycles of the first LED array 130 and the second LED array 140 as alternative operation. As a result, when a nature light with the third color temperature between the first color temperature and the second color temperature is obtained after the mixture of the light emitted by the first LED array 130 and the light emitted by the second LED array 140, the brightness of the color temperature adjustable LED lamp 100 has no obvious changes.

Figure 8A:
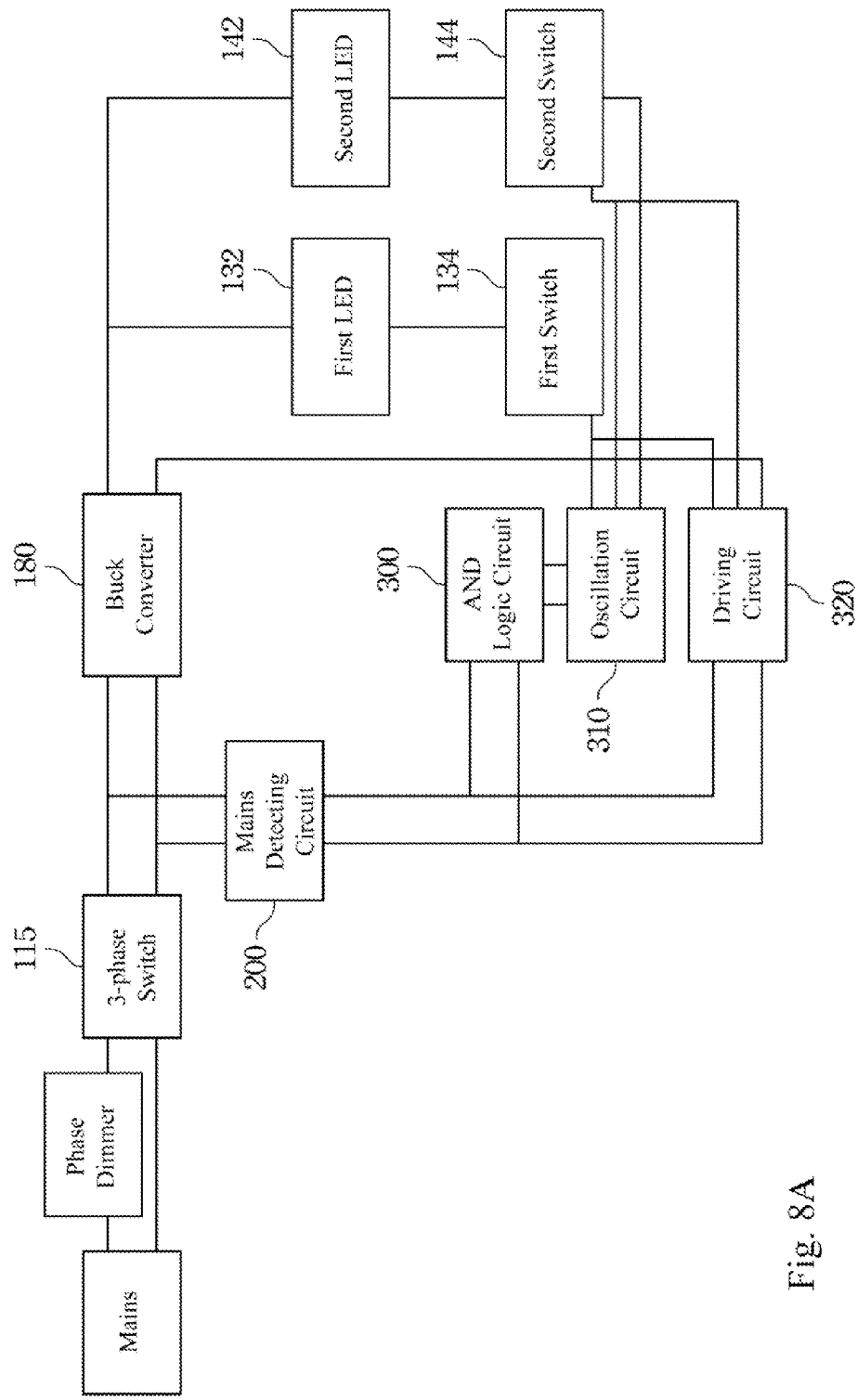
FIGS. 8A and 8B respectively illustrates a block diagram of different embodiments of the color temperature adjustable LED lamp of the present invention.
Figure 8B:
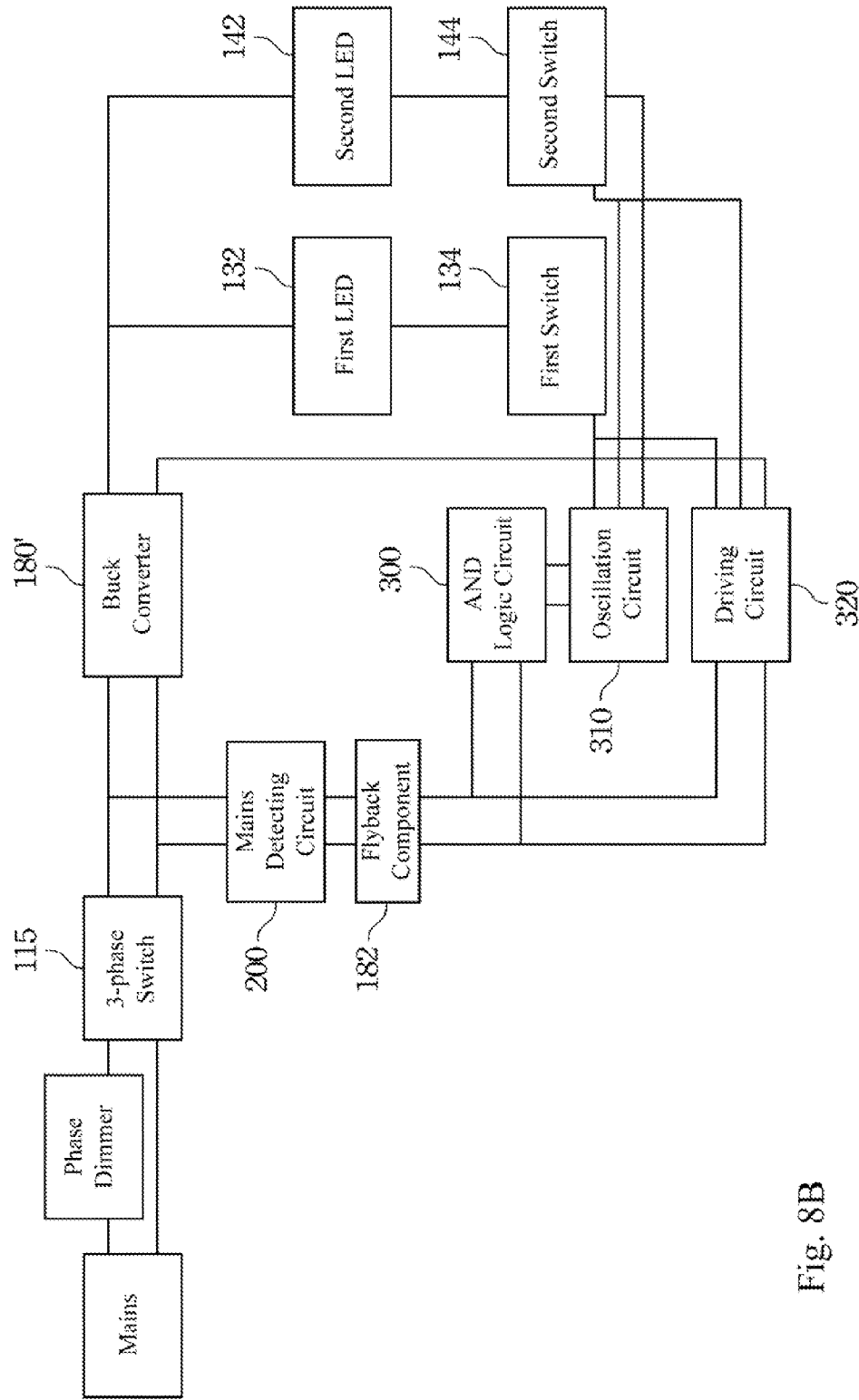

Referring to FIGS. 8A and 88, which each illustrate a block diagram of different embodiments of the color temperature adjustable LED lamp of the present invention. FIG. 8A uses a buck power supply circuit 180. FIG. 8B uses a flyback power supply circuit 180' in combination with a flyback component 182. When the 3-way switch 115 is under the first operation mode or the second operation mode, the driving circuit 320 does not actuate. The first partial voltage signal and the second partial voltage signal can directly enter the first LED array 130 or the second LED array 140 to conduct the first switch 134 and the second switch 144. When the 3-way switch 115 is under the third operation mode, the AND logic circuit 300 and the oscillation circuit 310 actuate. An oscillation signal is generated to the first switch 134 and the second switch 144 to make the working cycles of the first LED array 130 and the second LED array 140 as alternative operation. The detailed working principle of each of the circuits has been described in details as above.

Figure 9:
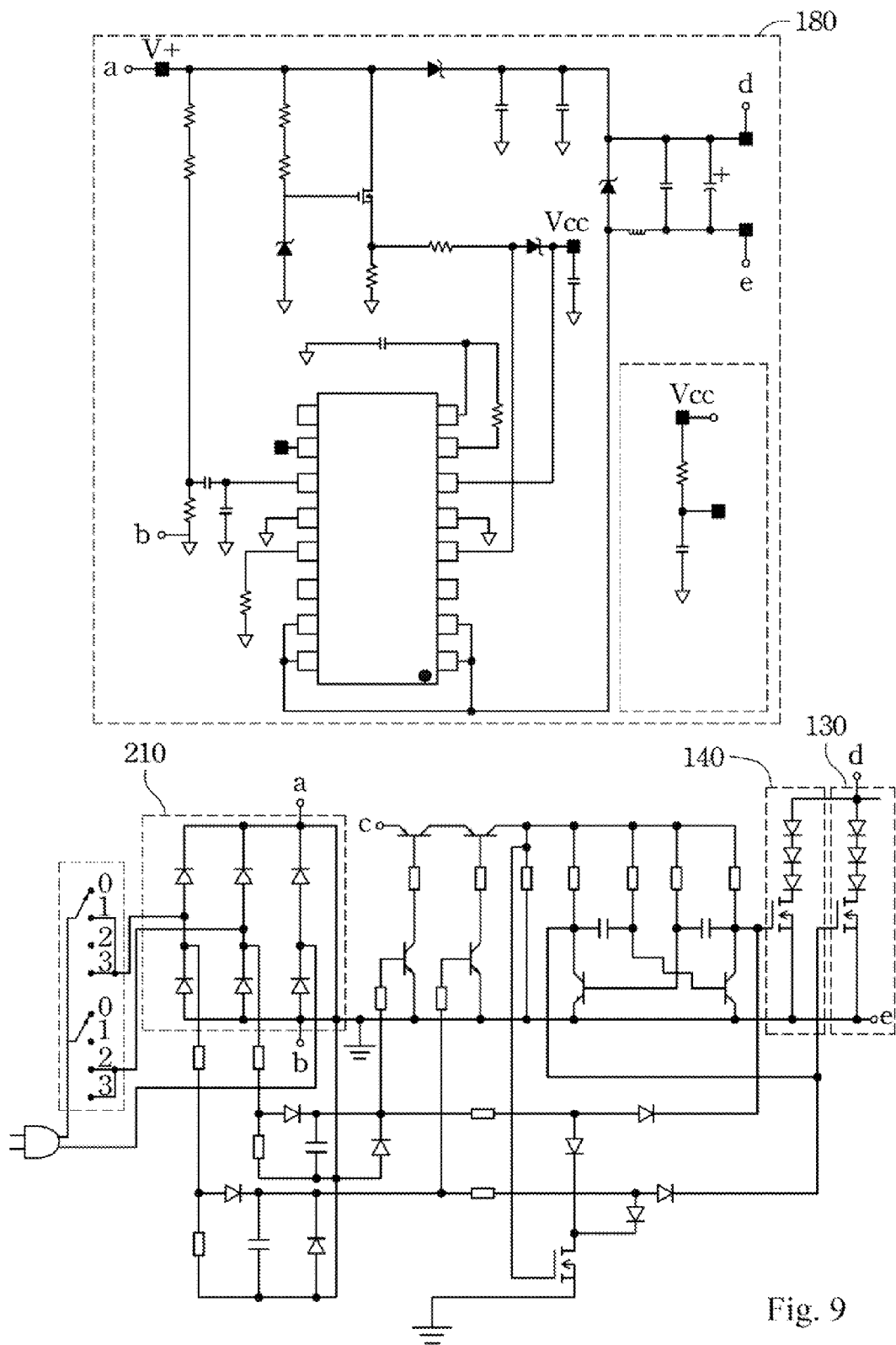
FIG. 9 is a circuit diagram of an embodiment of the color temperature adjustable LED lamp having a flyback converter.

FIG. 9 is a circuit diagram of an embodiment of the color temperature adjustable LED lamp having a flyback converter. The power supply circuit 180 is a flyback converter for providing a steady current to the first LED array 130 and the second LED array 140. An input end of the power supply circuit 180 includes an end point a and an end point b. The end point a and the end point b are respectively connected to an end point a and an end point b of the rectifier circuit 210. An output end of the power supply circuit 180 includes an end point c and an end point d. The end point c and the end point d are respectively connected to an end point c and an end point d at two ends of the first LED array 130 and the second LED array 140.

Figure 10:
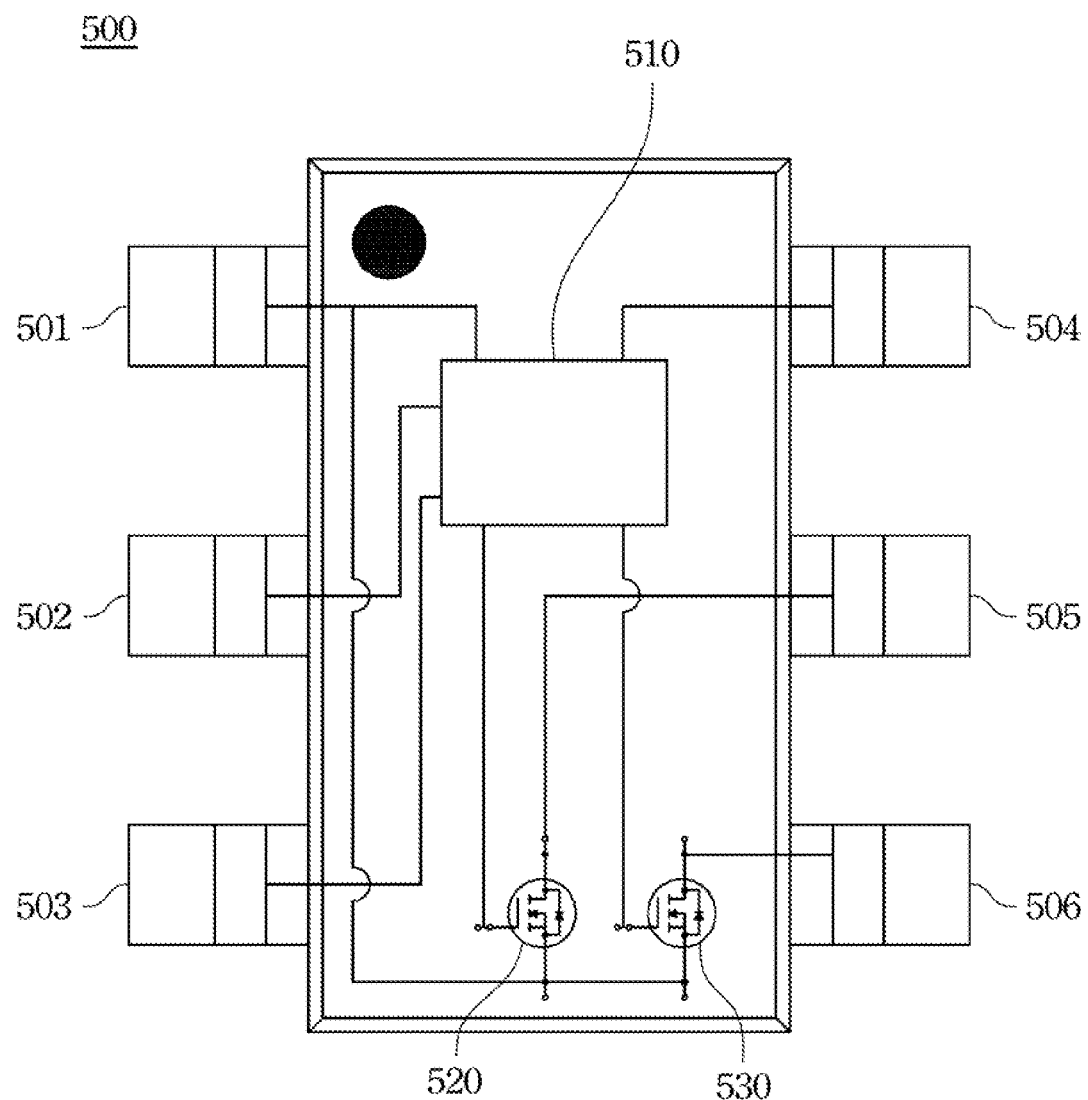
FIG. 10 is a schematic view of another embodiment of the color temperature adjustable LED lamp of the present invention.

Of course, the mains detecting circuit, the AND logic circuit, the oscillation circuit and the driving circuit described above can also be integrated into an application-specific integrated circuit. A control chip is used to connect a 3-way switch to the first LED array and the second LED array, as shown in FIG. 10. A control chip 500 can send a corresponding signal to actuate the first. LED array and the second LED array according to the modes of the 3-way switch (e.g., only conducting the first live wire, only conducting the second live wire or conducting the first live wire and the second live wire at the same time). The control chip 500 may be disposed in a 3-way lamp head. The control chip 500 has a logic circuit unit 510, a control switch 520 and a control switch 530. A first pin 501 is connected to the ground wire. A second pin 502 is connected to the first live wire. A third pin 503 is connected to the second live wire. A forth pin 504 is connected to the power supply. A fifth pin 505 and a sixth pin 506 are respectively connected to the first LED array and the second LED array. If lighting with a high power is needed, the control switches 520, 530 can be moved outside the control ship 500, and the control circuit in the control chip 500 does not change.

From the embodiment described above, it can be seen that the application of the present invention has the following advantages. The color temperature adjustable LED lamp uses two kinds of LEDs with different color temperatures as light sources. Compared with the usage of the fluorescent tube as the light source, the usage of the color temperature adjustable LED lamp can not only reduce the volume of the lighting lamp, but also has the benefits of environmental protection and power saving. Furthermore, the color temperature adjustable LED lamp uses the 3-way switch to control the actuation modes of the first LED array and the second LED array. During mixing of lights, instead of actuating simultaneously the first LED array and the second LED array are conducted alternatively, so as to solve the problem of uneven brightness.

Although embodiments of the present invention have been disclosed with reference to the above embodiments, these embodiments are not intended to limit the present invention. It will be apparent to those skilled in the art that to various modifications and variations can be made without departing from the spirit and scope of the present invention. Therefore, the scope of the present invention shall be defined by the appended claims.

What is claimed is:

1. A color temperature adjustable LED lamp, comprising:
a 3-way switch for selectively conducting a first live wire, a second live wire or the first and the second live wires;
a mains detecting circuit connected to the 3-way switch for detecting a conducting state of the first live wire and the second live wire, wherein when the first live wire is conducted, a first partial voltage signal is generated, and when the second live wire is conducted, a second partial voltage signal is generated;
an AND logic circuit connected to the mains detecting circuit, wherein when receiving the first partial voltage signal and the second partial voltage signal at the same time, the AND logic circuit generates a working signal;
an oscillation circuit connected to the AND logic circuit and generating an oscillation signal corresponding to the working signal;

a first LED array to emit a light with a first color temperature, wherein the first LED array is actuated while receiving the first partial voltage signal or the oscillation signal; and a second LED array to emit a light with a second color temperature, wherein the second LED array is actuated while receiving the second partial voltage signal or the oscillation signal.

2. The color temperature adjustable LED lamp of claim 1, wherein when the 3-way switch only conducts the first live wire, only the first LED array is actuated.

3. The color temperature adjustable LED lamp of claim 1, wherein when the 3-way switch only conducts the second live wire, only the second LED array is actuated.

4. The color temperature adjustable LED lamp of claim 1, wherein the first LED array comprises a first switch and a plurality of first LEDs connected with each other, and the second LED array comprises a second switch and a plurality of second LEDs connected with each other, wherein the first color temperature of the first LEDs is different from the second color temperature of the second LEDs.

5. The color temperature adjustable LED lamp of claim 4, wherein the first switch signal is connected to the mains detecting circuit and the oscillation circuit, and the second switch signal is connected to the mains detecting circuit and the oscillation circuit.

6. The color temperature adjustable LED lamp of claim 1, wherein when the 3-way switch conducts the first live wire and the second live wire, only the oscillation signal is sent to the first LED array and the second LED array, and thus the first LED array and the second LED array are alternatively operated.

7. The color temperature adjustable LED lamp of claim 1, further comprising a driving circuit connected to the AND logic circuit and the mains detecting circuit, wherein the driving circuit comprises a driving switch connected to a ground terminal, and when the working signal is received by the driving circuit, the driving switch is conducted to connect the first partial voltage signal and the second partial voltage signal to the ground.

8. The color temperature adjustable LED lamp of claim 1, wherein the mains detecting circuit comprises:

a rectifier circuit for converting an alternating current into a direct current;

a first voltage divider circuit connected to the rectifier circuit for generating the first partial voltage signal; and a second voltage divider circuit connected to the rectifier circuit for generating the second partial voltage signal.

* * * * *